United States Patent [19]

Braat

[11] Patent Number: 4,986,641
[45] Date of Patent: Jan. 22, 1991

[54] RETROFOCUS OBJECTIVE LENS AND OPTICAL SCANNING DEVICE PROVIDED WITH SUCH A LENS

[75] Inventor: Josephus J. M. Braat, Eindhoven, Netherlands

[73] Assignee: U.S. Philips Corp., New York, N.Y.

[21] Appl. No.: 404,934

[22] Filed: Sep. 7, 1989

[30] Foreign Application Priority Data

May 19, 1989 [NL] Netherlands .................. 8901245

[51] Int. Cl.⁵ .................. G02B 13/18; G02B 27/44
[52] U.S. Cl. .................. 350/432; 350/162.17
[58] Field of Search .................. 350/432, 3.72, 162.17, 350/162.24

[56] References Cited

U.S. PATENT DOCUMENTS 4,545,653 10/1985 Brenden et al. .................. 350/432
4,641,929 2/1987 Braat .................. 350/432

FOREIGN PATENT DOCUMENTS 1965069 7/1971 Fed. Rep. of Germany .
3421705 4/1986 Fed. Rep. of Germany .
0294902 12/1988 European Pat. Off. .
0199301 8/1988 Japan .................. 350/162.17

Primary Examiner—Bruce Y. Arnold
Assistant Examiner—Rebecca Gass
Attorney, Agent, or Firm—William L. Botjer

[57] ABSTRACT

An objective lens (20) and an optical scanning device (30, 20, 50) provided with such a lens are described, of which lens both surfaces (22, 23), viewed from the object side, are concave, while the focal length is considerably smaller than its thickness (d) of along the axis and the surface (23) at the image side is aspherical. When using this objective lens, the scanning device may be very compact.

13 Claims, 5 Drawing Sheets

RETROFOCUS OBJECTIVE LENS AND OPTICAL SCANNING DEVICE PROVIDED WITH SUCH A LENS

BACKGROUND OF THE INVENTION

The invention relates to an objective lens for focusing a diverging radiation beam into a diffraction-limited radiation spot, comprising a single lens body of transparent material having a first refractive surface at the object side and a second refractive surface at the image side, at least one of said surfaces being aspherical. The invention also relates to an optical scanning device provided with such a lens.

Such a lens and scanning device are known from U.S. Pat. No. 4,668,056. In the embodiment described in said Patent in which a diverging beam emitted by a radiation source is focused to a diffraction-limited radiation spot having a half-value width of the order of 1 μm on an information plane of a transparent record carrier, the objective lens is a biconvex lens one of whose refractive surfaces is aspherical. An aspherical lens surface is understood to mean a surface whose fundamental shape is aspherical but whose real shape has small deviations therefrom so as to correct for spherical aberrations of the fundamental shape. The known lens has a relatively large diffraction-limited image field with a diameter of the order of 200 μm so that a sharp radiation spot can also be formed in the surroundings of the optical axis enabling the position of the scanning spot with respect to a pattern of tracks to be scanned in the information plane to be corrected by displacing the objective lens and the scanning beam with respect to each other.

The build-in length, from the radiation source to the information plane, of the known device is roughly given by $(M + M^1 + 2).f + hh'$ in which M is the magnification, f is the focal length, i.e. the distance between the object focus and the object principal point, and hh' the distance between the main surfaces H and H' of the objective lens. For a thin lens the term hh' is negligible with respect to the left term. The build-in length of the said embodiment, in which the magnification is of the order of 4.5 and the focal length is of the order of 3.2 mm, is approximately 20 mm. To reduce the build-in length while ensuring the same magnification, the focal length should have to be reduced. However, problems may then occur in connection with the desired free working distance of the objective lens when using it for scanning an information plane in a record carrier. In fact, this information layer is located behind a transparent substrate having a given thickness, for example 1.2 mm, while the record carrier must be placed at some distance from the objective lens so as to prevent the objective lens from bumping against the record carrier and being damaged in the case of unwanted movements of the record carrier with respect to the objective lens.

SUMMARY OF THE INVENTION

The present invention has for its object to provide an objective lens in which a sufficiently large free working distance is accompanied by a considerably smaller focal length than in known objective lenses and which moreover can be manufactured in a relatively simple manner. This objective lens is characterized in that both the first and the second refractive surfaces, viewed from the object side, is concave, in that the focal length is considerably smaller than its thickness along the axis and in that the second refractive surface is aspherical.

The design of this objective lens, which may be characterized as a retrofocus lens or an inverse telephoto lens, is based on the recognition that the image field may be small for the said application and in that the lens may exhibit coma because this coma may be compensated by adapting the position of the radiation source when assembling the objective lens and the radiation source in a scanning device. Due to the small build-in length of the objective lens and the corresponding small dimensions and the light weight of the scanning device, it can be positioned rapidly and accurately with respect to the track structure to be scanned in an information plane of a record carrier so that the objective lens only needs to have a small image field.

In the objective lens according to the invention the diverging beam incident on the first surface is rendered even more diverging so that it completely fills the second surface, while the second surface focuses the widened beam.

It is to be noted that this principle of firstly diverging and subsequently focusing for an objective lens intended for a scanning device is known per se from European Patent Application No. 0,294,902 in the name of the present Applicant. The known objective system is, however, a mirror objective. The requirements to be imposed on the accuracy of the shape of the reflecting surfaces of the mirror objective are a factor of 5 to 6 larger than those which must be imposed on transparent refractive surfaces so that the objective lens according to the present invention is considerably simpler to manufacture.

According to a further characteristic the first refractive surface may be aspherical so as to enlarge the image field of this objective lens.

A preferred embodiment of the objective lens is characterized in that a third surface is present between the first refractive surface and the second refractive surface, which third surface is reflecting and deflects the chief ray of the beam entering through the first refractive surface through an angle of approximately 90° towards the second refractive surface.

This reduces the volume and hence the weight of the objective lens by approximately 50% so that this lens is even more suitable to be built in a small and lightweight scanning device.

It is to be noted that European Patent Application No. 0,272,724 describes an optical scanning device with an objective lens in which a reflecting surface is provided between the two refractive surfaces. The fundamental shape of this objective lens is, however, a biconvex lens with a relatively large focal length and it is not a retrofocus lens with a short focal length.

The invention also relates to an optical scanning device for scanning an information plane on a transparent substrate of a record carrier, which scanning devices comprises a radiation source facing the side of the substrate remote from the information plane and an objective system for focusing the diverging radiation beam supplied by the source to a scanning spot on the information layer. This scanning device is characterized in that the objective system is constituted by an objective lens as described hereinbefore.

Such a scanning device has a dimension of the order of several millimetres, measured along the optical axis, and is particularly suitable for use in portable players for optical discs or in players to be built in cars, or in memory systems with a plurality of optical discs.

Such a scanning device intended for scanning a reflecting information plane may be further characterized by a diffraction element for deflecting radiation from the information plane towards a radiation-sensitive detection system which is arranged at the same side of the objective lens as the radiation source.

The diffraction element may be formed in such a manner that it renders the beam incident on the detection system suitable for detecting focusing errors, in cooperation with an adapted detection system. A focusing error is understood to mean a deviation between the plane of focus of the objective lens and the information plane.

A first embodiment of the scanning device with a diffraction element adapted for focus-error detection is characterized in that the diffraction element is an element introducing astigmatism and in that the radiation-sensitive detection system comprises four detectors which are arranged in four different quadrants around the chief ray of the beam deflected by the diffraction element.

The element introducing astigmatism may be a linear grating which because it is positioned in a non-parallel beam introduces a certain extent of astigmatism due to its positioning in this beam. The shape of the radiation spot formed by this beam on the detection system is determined by the extent of focusing on the information plane.

In the case of a defocus this radiation spot is deformed to an elliptical spot whose major axis is located in one of two mutually perpendicular directions, also referred to as astigmatic directions, dependent on the sign of defocus. The separating strips between the four detectors extend at angles of approximately 45° to the astigmatic directions.

If a larger extent of astigmatism is desired, the diffraction element may be a diffraction grating with straight grating strips and a linearly varying grating period. Preferably, the astigmatic diffraction element is a holographic grating with curved grating strips and a non-linearly varying grating period. Imaging errors such as coma can be corrected by adapting the curvatures of the grating strips.

It is to be noted that the use of a grating with a linearly varying grating period in combination with a four-quadrant detector for generating a focus-error signal is known per se from U.S. Pat. No. 4,358,200. However, the device according to said Patent Specification does not comprise a retrofocus objective lens.

A second possibility of focus-error detection, which is preferred to the above-mentioned so-called astigmatic method as regards temperature sensitivity and ease of assembling control, is realised in an embodiment which is characterized in that the first diffraction element is a composite diffraction grating comprising two sub-gratings, which grating splits the deflected scanning beam into two sub-beams, and in that the composite detection system comprises two detector pairs, the first and the second sub-beam cooperating with a first and a second detector pair, respectively.

In this device the scanning spot is re-imaged in two radiation spots on the detector pairs. Each radiation spot moves transversely to the separating strip of the associated detector pair in dependence upon a focusing error of the scanning beam with respect to the information plane. This offset can be detected by comparing the output signals of the detectors. This focus-error detection method is known as the double Foucault method.

A preferred embodiment of the last-mentioned device is characterized in that the sub-gratings have a varying grating period and in that the grating strips of the sub-gratings are curved.

Due to the varying grating period and the curved grating strips the composite grating has a lens action and by displacing this grating along the direction of the boundary line of the sub-gratings the energy distribution of the radiation spots can be made symmetrical with respect to the associated detector pairs, inter alia because the imaging length of the assembly of objective system and grating is adapted to the distance, in the direction of the optical axis, between the diode laser and the detectors. This is particularly important if the detectors in the form of photodiodes and the diode laser are combined in one component and are fixed with respect to each other. A composite grating with varying grating periods and curved grating strips, which grating is also referred to as a hologram, provides the possibility of correcting for imaging errors such as coma and astigmatism which may occur when using a grating with straight grating strips.

In principle there are two embodiments of a scanning device in which the Foucault focus-error detection method is used. The first embodiment is characterized in that the grating strips of the one sub-grating have the same main direction as those of the other sub-grating, in that the average grating periods of the sub-gratings are different and in that the detector pairs are juxtaposed in a direction parallel to the bounding line between the sub-gratings. In this embodiment the sub-gratings of the scanning beam are deflected in the same direction but at different angles.

The second embodiment is characterized in that the sub-gratings have the same average grating period, in that the main directions of the grating strips of the one sub-grating extend at a first angle and those of the other sub-grating extend at a second angle to the bounding line of the two sub-gratings and in that the detector pairs are juxtaposed in a direction transversely of the direction of the said bounding line. The sub-beams of the scanning beam are now deflected preferably through the same angles but in different directions. This embodiment is preferred to the previous embodiment due to its better mounting tolerances, control facilities and stability.

In order to be able to follow an information track accurately by means of the scanning spot when scanning an information structure arranged in tracks, the scanning device may be characterized by a diffraction element for forming a scanning beam and two auxiliary beams from the radiation beam supplied by the radiation source.

The sub-beams formed by the diffraction element are focused by the objective lens to two auxiliary spots which are located on the two different edges of a scanned track in the information plane. Each auxiliary spot is re-imaged on a separate detector of the detection system. A tracking error signal, that is to say a signal giving an indication about the magnitude and the direction of a deviation between the centre of the scanning spot and the centre line of the scanned track, can be derived from the difference between the output signals of the said two detectors.

According to a further characteristic of the scanning device, each of the above-mentioned gratings may be provided on one of the surfaces of the objective lens.

Such a grating then does not require a separate support, which further simplifies the scanning device.

BRIEF DESCRIPTION OF THE DRAWINGS

Embodiments of the invention will now be described in greater detail with reference to the accompanying drawings in which.

DETAILED DESCRIPTION OF THE PREFERRED EMBODIMENTS

Figure 1:
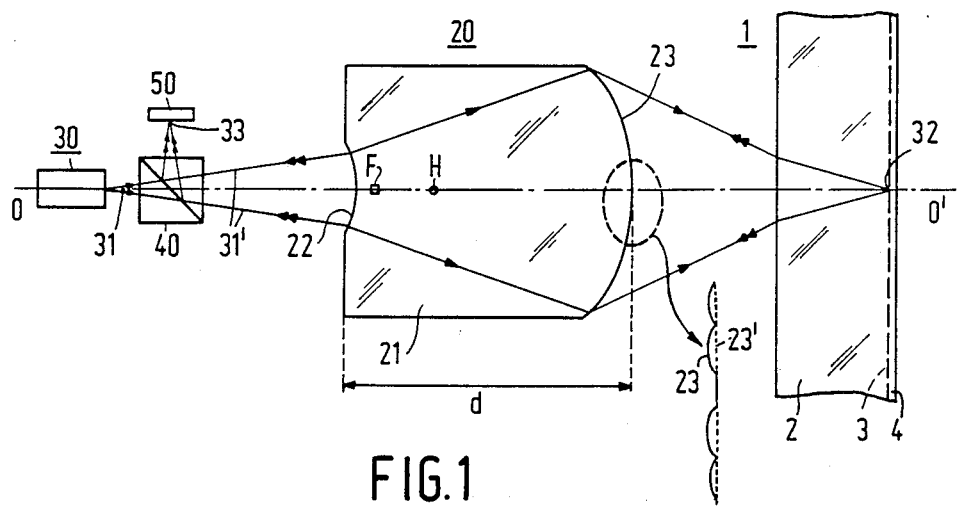
FIG. 1 shows a first embodiment of a scanning device comprising a first modification of the objective lens according to the invention.

FIG. 1 shows in a tangential cross-section a part of an optical record carrier 1 having a transparent substrate 2 and an information layer 3 which may be coated with a protective coating 4. A scanning device comprising an objective lens 20 and a radiation source 30, for example a diode laser is arranged close to this record carrier. The radiation source emits a diverging scanning beam 31 which is focused in the information plane 3 by the objective lens to a scanning spot 32 having a half-value width of the order of 1 μm. The entire information plane can be scanned by rotating the record carrier around an axis (not shown) which is parallel to the optical axis 00' and by moving the scanning device and the record carrier with respect to each other in a radial direction, i.e. the direction perpendicular to the plane of the drawing in FIG. 1.

The objective lens comprises a relatively thick body 21 of glass preferably having a high refractive index such as ZnSe or SFL6 with a refractive index of 2.53 and 1.80, respectively. This body has a first refractive surface 22 and a second refractive surface 23. The surface 22 has a diverging effect on the entering diverging beam 31 so that this beam even further diverges within the lens body, such that it fills the entire refractive surface 23. This surface has a strong converging effect and focuses the beam in the scanning spot 32 which is diffraction-limited.

The principal point of the lens is denoted by H and the object focus is denoted by F. In the embodiment of FIG. 1 the focus F is located within the lens. However, this focus may also be located outside the lens. The focal length, which is defined as the distance between the object focus and the principle point, is considerably smaller than the axial thickness d of the lens. The scanning device may therefore be very compact but also very rigid.

One embodiment of the objective lens consisting of ZnSe has a focal length of approximately 0.5 mm, an axial thickness d of approximately 2.8 mm and a distance between the lens and the record carrier of approximately 1.1 mm. At a substrate thickness of approximately 1.2 mm the total length from the front face of the lens to the information layer is only approximately 5.2 mm.

If the two surfaces 22 and 23 were spherical, the objective lens would exhibit spherical aberrations. To correct for these aberrations, the surface 23 is aspherical, which means that this surface has a shape having small deviations from a sphere. This aspherical shape is shown in the inset of FIG. 1. The real surface is denoted by a solid-line curve 23, while the spherical fundamental shape is denoted by a broken line 23' which for the sake of clarity is shown as a straight line.

An objective lens having an aspherical surface 23 has a diffraction-limited field of, for example 5 μm, which is considerably smaller than that of the objective systems hitherto used for this purpose. This means that when scanning a record carrier with information tracks it is no longer possible to change over from one track to another track by moving the scanning beam with respect to the objective lens. However, this is no drawback because its compactness and its light weight make the scanning device as a whole easily movable at the desired speed.

If a larger image field is desired, the refractive surface 22 may also be aspherical. The image field may then have a diameter of, for example 50 μm.

The technique described in U.S. Pat. No. 4,668,065 for providing an aspherical shape on the surface of a conventional objective lens may also be used for providing an aspherical shape on the surface 23 or on both surfaces 22 and 23. An objective lens is then obtained whose aspherical surface is formed by the aspherical outer surface of a transparent synthetic material layer which is provided on the spherical surface of the glass body. The synthetic material may be a polymerisable material, for example a synthetic material which cures under the influence of ultraviolet radiation and which is provided in a liquid state on the lens surface and is given the desired shape by means of a mold.

The record carrier may be read in transmission. A radiation-sensitive detection system is then arranged behind this record carrier for converting the read beam passing through the record carrier and modulated in accordance with the information which has been read into an electric signal. However, the information plane is preferably reflecting. The reflected and modulated beam 31' is then received by the objective lens 20 again so as to traverse the same path as the projected beam 31, but then in the reverse direction. The beam 31' may enter the radiation source 30 again. If this radiation source is a diode laser, the so-called feedback effect, which is described in German Patent Specification No. 1,584,664, may be used to read the written information.

However usually a beam-separating element, for example a partly transmissive mirror or prism 40 with which a portion of the reflected beam 31' is reflected towards the radiation-sensitive detection system 50 is arranged in the common radiation path of the projected beam 31 and the reflected beam 31', as is shown in FIG. 1.

Figure 2:
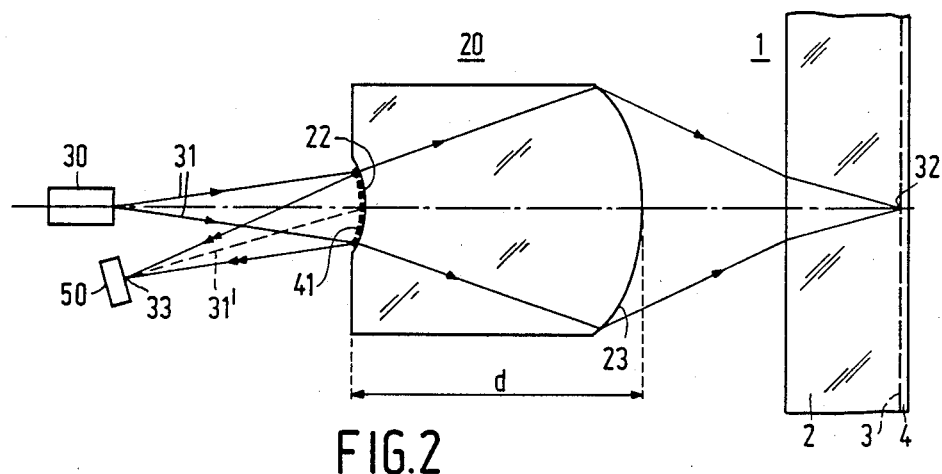
FIGS. 2 and 3 show further embodiments of the scanning device in which a diffraction grating is arranged on one of the surfaces of the objective lens.

For separating the projected and the reflected beam increasing use is being made of a diffraction grating. This grating may be a separate element arranged between the radiation source and the objective lens. As is shown in FIG. 2, the grating 41 is preferably arranged on the surface 22 of the objective lens. This grating splits a beam incident thereon into a non-deflected zero order sub-beam, in a plus first order and a minus first order sub-beams and into a plurality of higher order sub-beams. The grating parameters such as the ratio between the width of the grating strips and that of the intermediate grating strips and, in the case of a phase grating, the shape and depth of the grating grooves may be chosen to be such that the intensity product of the zero order sub-beam formed at the first passage through the grating 41 and a first order sub-beam formed at the second passage through the grating is maximum. It can be ensured that the first order sub-beams formed at the passage through the grating 41 are deflected through such an angle that the radiation of these beams after reflection by the information plane 3 does not reach the detection system 50.

In the embodiment of FIG. 2 the radiation source 30 and the radiation-sensitive detection system 50 are arranged at some distance from the lens surface 22. This provides the advantage that a fine control is possible when using a holographic grating as a diffraction element by moving the objective lens with this grating with respect to the detection system.

Figure 3:
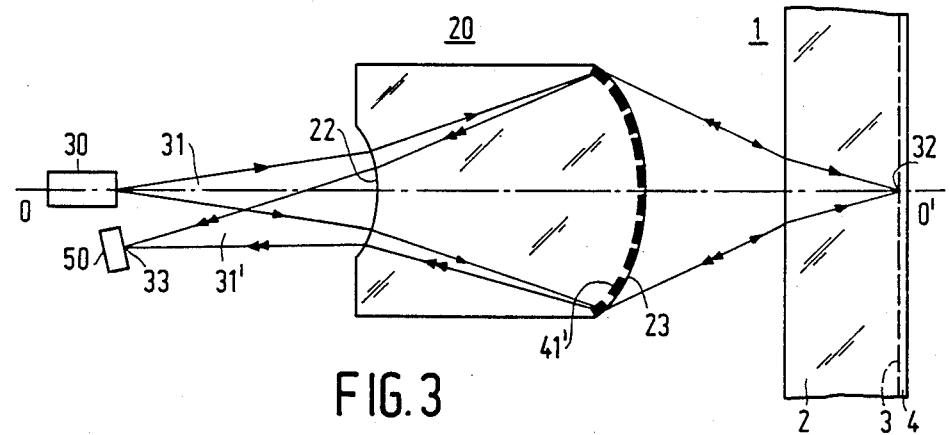

In the embodiment according to FIG. 3 a diffraction grating 41' is arranged on the second surface 23 of the objective lens. This grating deflects a part of a reflected beam within the objective lens 20 from the original reflected beam so that the reflected beam portion is incident on the surface 22 at a different angle and is thereby directed towards the detection system 50.

The separate grating arranged between the radiation source 30 and the objective lens, or the gratings 41 or 41' on the surfaces 22 and 23 may be implemented in such a manner that the beam originating from this grating and directed towards the detection system 50, together with an adapted detection system, is suitable for supplying a focus-error signal. A first embodiment of such a grating with the associated detection system is shown diagrammatically in FIG. 4. In this Figure the beam 31' is denoted by its cross-section at the area of the grating, for example grating 41. This grating 41 comprises two sub-gratings 42 and 43 which are separated from each other by the line 44. The grating strips of the sub-gratings are denoted by the reference numerals 45 and 46. These grating strips are separated by intermediate strips 47 and 48. In this embodiment the sub-gratings have the same grating periods but the main directions of the preferably curved grating strips 45 of the sub-grating 42 extend at a first angle to the bounding line 44, while the main directions of the curved grating strips 46 of the second sub-grating 43 extend at a second, preferably equally large but opposite angle to the bounding line. The sub-beams are substantially deflected in a direction transverse to the main directions. Since the main directions are different, the sub-beams $31_a'$ and $31_b'$ are deflected at different angles in the YZ plane. This means that in the plane of the detectors, the XY plane, the radiation spots $31_a'$ and $31_b'$ are offset with respect to each other in the Y direction. In this Figure and the following FIGS. X, Y and Z denote the axes of a system of coordinates whose origin 0 coincides with the centre of the radiation-emitting surface of the diode laser 30.

Radiation-sensitive detectors in the form of photodiodes 51, 52 and 53, 54 separated by narrow strips 55 and 56 are associated with each of the subbeams $31_a'$ and $31_b'$, respectively. These detectors are positioned in such a way that in the case of a correct focusing of the beam 31 on the information plane 3 the intensity distribution of the radiation spots $33_a$ and $33_b$ formed by the sub-beams $31_a'$ and $31_b'$ is symmetrical with respect to the detectors 51, 52 and 53, 54, respectively. When a focus error occurs, the radiation spots $33_a'$ and $33_b'$ will become asymmetrically larger and the centre of the radiation distribution of each radiation spot moves transversely to the separating strips 55, 56 of the associated detector pair.

If the output signals of the detectors 51, 52, 53 and 54 are represented by $S_{51}$, $S_{52}$, $S_{53}$ and $S_{54}$, respectively, the focus-error signal $S_f$ will be given by:

$$S_f = (S_{51} + S_{54}) - (S_{52} + S_{53})$$

A signal which is proportional to the information being read, or the information signal $S_i$ is given by:

$$S_i = S_{51} + S_{52} + S_{53} + S_{54}.$$

Figure 4:
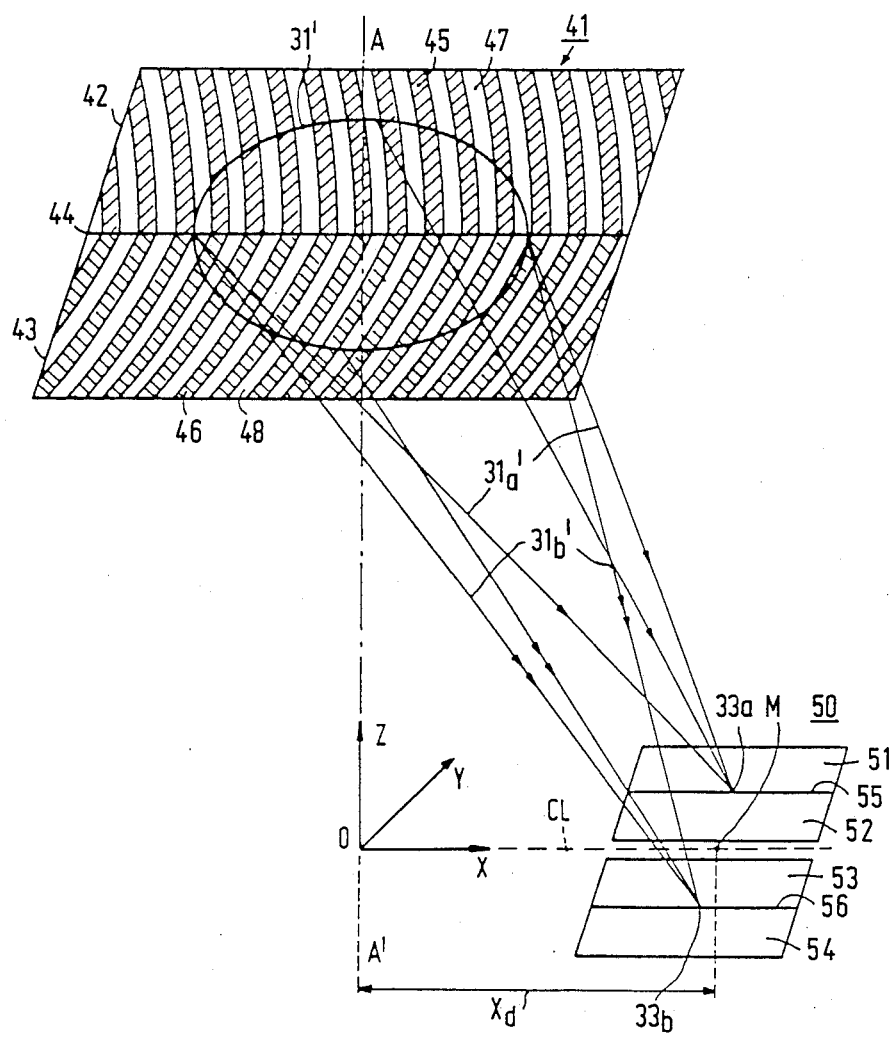
FIGS. 4, 5, 6 and 7 show different embodiments of a diffraction grating.
Figure 5:
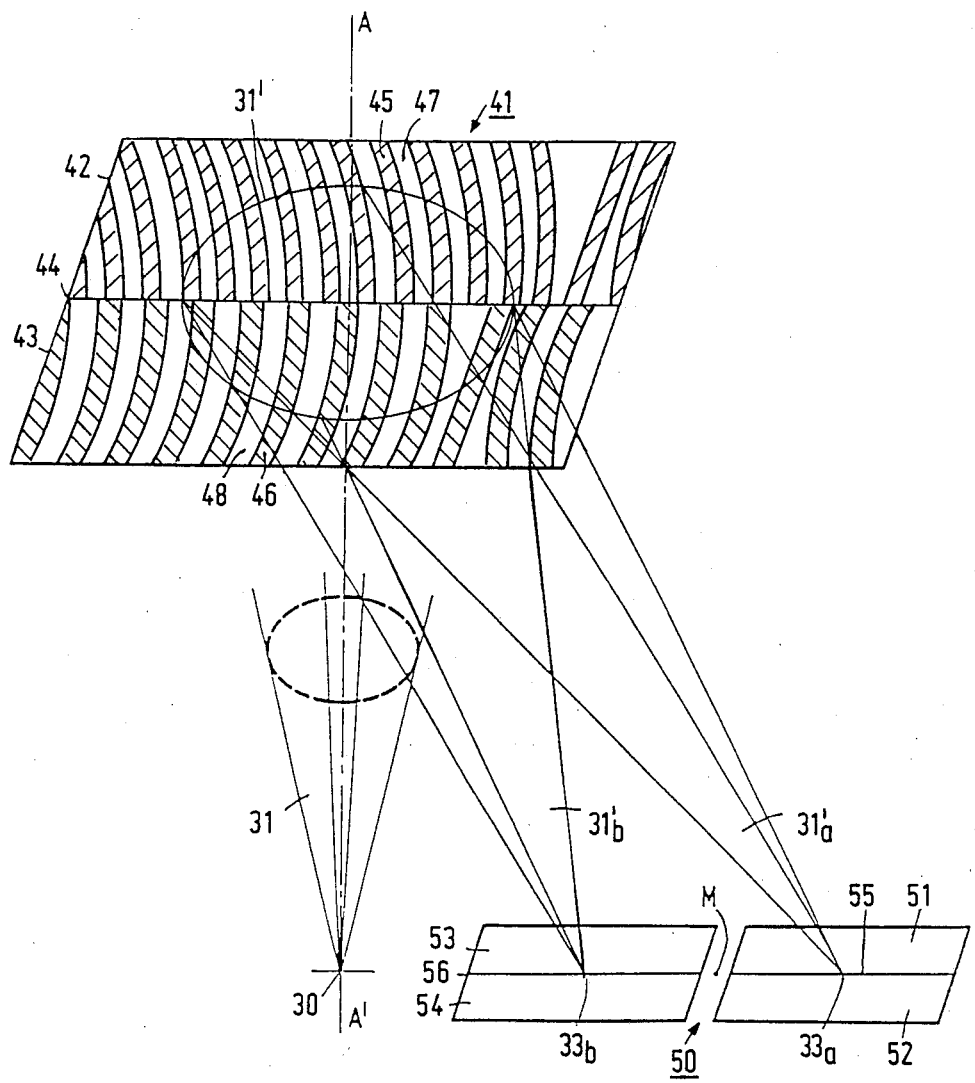

For generating a focus-error signal the composite grating according to FIG. 4 may be replaced by the grating 41 shown in FIG. 5. In this Figure the scanning beam 31, the cross-section of the reflected beam 31' in the grating plane and the sub-beams $31_a'$ and $31_b'$ are shown. The main directions of the preferably curved grating strips of the two sub-gratings 42 and 43 now extend at the same angle to the boundary line 44 while the average grating periods of the two sub-gratings are different. Consequently the angle at which the sub-beam $31_a'$ is deflected is different from the angle at which the sub-beam $31_b'$ is deflected. This means that in the plane of the detectors 51, 52, 53 and 54 the radiation spots $33_a$ and $33_b$ are offset with respect to each other in the direction of the boundary line 44.

The sub-gratings 42 and 43 may have straight grating strips and a constant grating period. However, preferably use is made of a type of grating also referred to as hologram which has a varying grating period in which the variation in the period is, for example of the order of several percent of the average grating period. Moreover, as is shown in FIGS. 4 and 5 the grating strips of the two sub-gratings are curved. These sub-gratings thus have a variable lens action. Due to the varying grating period the positions of the radiation spots $33_a$ and $33_b$ can be varied by moving the grating 41 in its own plane. Aberrations in a direction perpendicular to the direction of the boundary line 44 can be minimised by suitable curvatures of the grating strips. The possibility of displacing the positions of the radiation spots is particularly important if an integrated laser-photodiode unit is used, i.e. a component in which the diode laser unit and the photodetectors are arranged on one support and are therefore fixed with respect to each other and thus have a fixed mutual distance in the Z direction. This distance is subject to manufacturing tolerances and cannot be corrected during the assembly of the device by moving the photodiodes with respect to the laser diode in the Z direction.

An important advantage of the diffraction grating with curved grating strips, or hologram, as compared with the grating having straight grating strips is that the optical aberrations such as coma and astigmatism which may occur when using the last-mentioned grating can be avoided in the first-mentioned grating by taking these aberrations into account in the manufacture of this holographic grating and by adapting the curvatures of the grating strips thereto.

It is to be noted that apart from the above-mentioned advantages of holographic gratings, the grating should be a holographic grating if it is provided on a curved lens surface 22 or 23, due to the curvature of the relevant lens surface. Moreover, if the grating is provided on the surface 23, as is shown in FIG. 3, it will have to be corrected for the fact that the chief ray of the beam 31' is not incident on the surface 22 at the optical axis. The embodiment of FIG. 2 is therefore preferred to that of FIG. 3.

Figure 6:
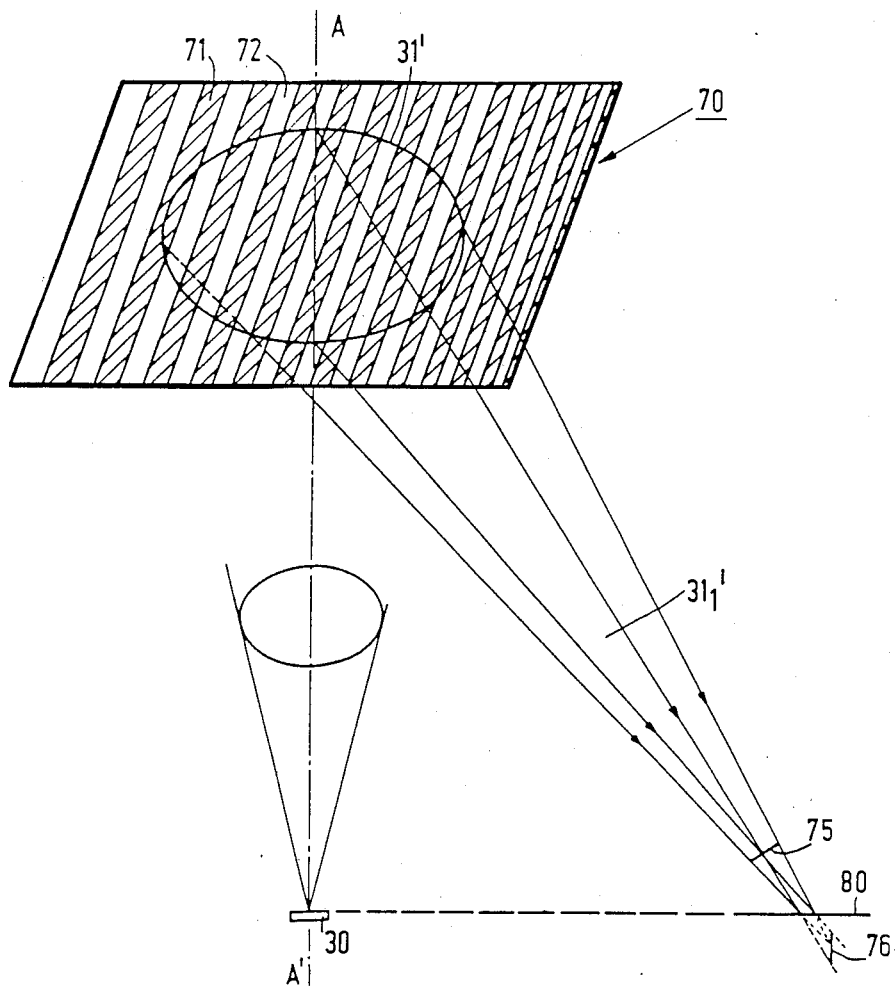
Figure 7:
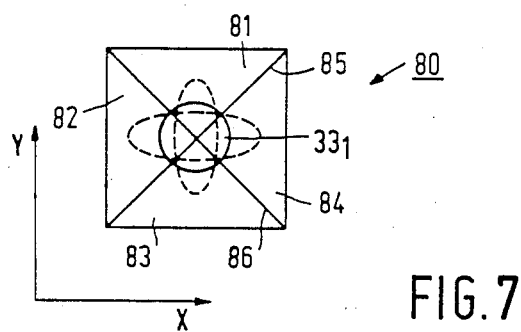

FIG. 6 shows an embodiment of a grating 70 which converts the reflected scanning beam 31' into an astigmatic beam $31_1'$. In principle, this grating has straight grating strips 71 and a linearly varying grating period. The grating is dimensioned in such a way that the radiation of the beam 31' is largely deflected in one order, for example the +1 order. The first order beam $31_1'$ is no longer focused in one point but in two mutually perpendicular focal lines 75 and 76, the line 75 being located at a position where the beam $31_1'$ would be focused if the grating were not astigmatic. When a focusing error occurs, the focal lines 75 and 76 are displaced simultaneously in the same direction and over the same distance. A so-called four-quadrant detector 80 is arranged in a plane approximately halfway between the positions which the astigmatic focal lines occupy if the scanning beam is sharply focused on the information plane. This detector, shown in FIG. 7, comprises four detectors 81, 82, 83 and 84 which are arranged in four different quadrants around the chief ray of the deflected beam $31_1'$. If the scanning beam is sharply focused on the information plane 3, the radiation spot $33_1'$ formed by the beam $31_1'$ in the plane of the detectors is round, as is denoted by means of the solid-line circle in FIG. 7. If a focusing error occurs, the radiation spot $33_1'$ is deformed to an elliptical spot, as is illustrated by means of the broken-line ellipses in FIG. 7. The major axis of the ellipse extends at an angle of 45° to the separating strips 85 and 86, the sign of the angle being determined by the focus-error sign. If the signals of the detectors 81, 82, 83 and 84 are represented by $S_{81}$, $S_{82}$, $S_{83}$ and $S_{84}$, the focus-error signal $S_f$ will be given by:

$$S_f = (S_{81} + S_{83}) - (S_{82} + S_{84})$$

If the grating 70 is arranged between the radiation source 30 and the objective lens 20, it may be implemented as a holographic grating with curved grating strips so that the adjusting and correction possibilities described with reference to FIGS. 4 and 5 are obtained again. If the grating 70 is arranged on one of the lens surfaces 22 or 23, the grating must be holographic so as to correct for the curvature of the relevant surface, in which case also the adjusting and correction possibilities may be obtained. Furthermore it is (again) preferred to arrange the grating 70 on the surface 22 instead of on the surface 23.

Figure 8:
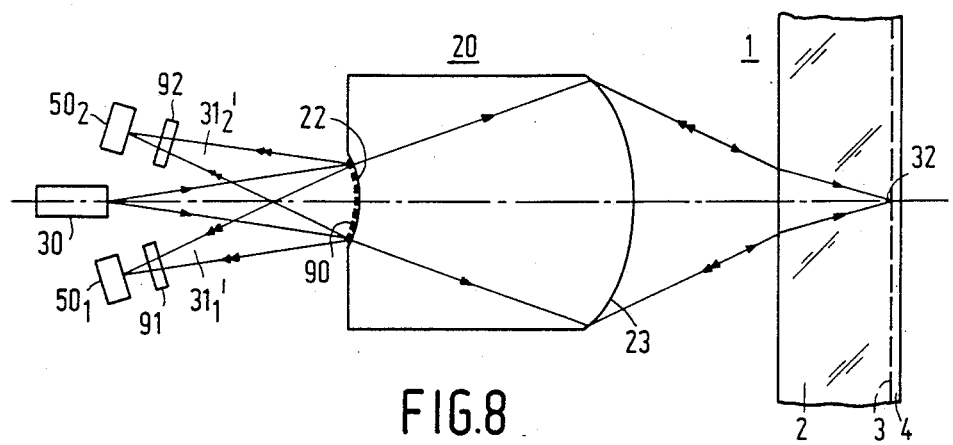
FIG. 8 shows an embodiment of the scanning device suitable for magneto-optical discs.

FIG. 8 shows an embodiment of the scanning device which is specially suitable for writing and reading so-called magneto-optical record carriers. Such record carriers and write and read devices for these carriers are described in inter alia the Article "Erasable magneto-optical recording" in "*Philips' Technical Review*" Vol. 42, no. 2, 1985, pages 37–47. As described in this Article, a so-called differential method is preferably used when reading a magneto-optical record carrier. The radiation reflected by the information plane whose direction of polarisation is modulated in time in accordance with the information which has been read is split, after passage through the objective, into two mutually perpendicularly polarised sub-beams which are incident on separate detectors. In the known device the beam is split by means of a polarisation-sensitive beam splitter.

The scanning device according to FIG. 8 does not require such a beam splitter because a grating 90 supplies two spatially separated beams $31_1'$ and $31_2'$, preferably the +1 order and the −1 order beams. It can be ensured that these beams have the same intensity. Polarisers 91 and 92 are arranged between the detectors $50_1$ and $50_2$ in such a way that the beam $31_1'$ incident on the detector $50_1'$ has a first direction of polarisation and the beam $31_2$ incident on the detector $50_2$ has a second direction of polarisation perpendicular to the first direction of polarisation.

In FIG. 8 the grating 90 is arranged on the first lens surface 22. If this grating is arranged on the second lens surface 23, the scanning device can be given its most compact form. This also applies to the embodiments described hereinbefore.

When scanning an information plane with information tracks, it must be ensured that the centre of the scanning spot always coincides with the centre line of the scanned track. To this end the scanning device must have means for detecting a deviation between the centre of the scanning spot and the centre line of the track, i.e. means for generating a tracking error signal. The position of the scanning spot with respect to the centre line of the track can then be corrected by means of this signal, for example, by moving the information plane and the scanning device with respect to each other in a radial direction.

Figure 9:
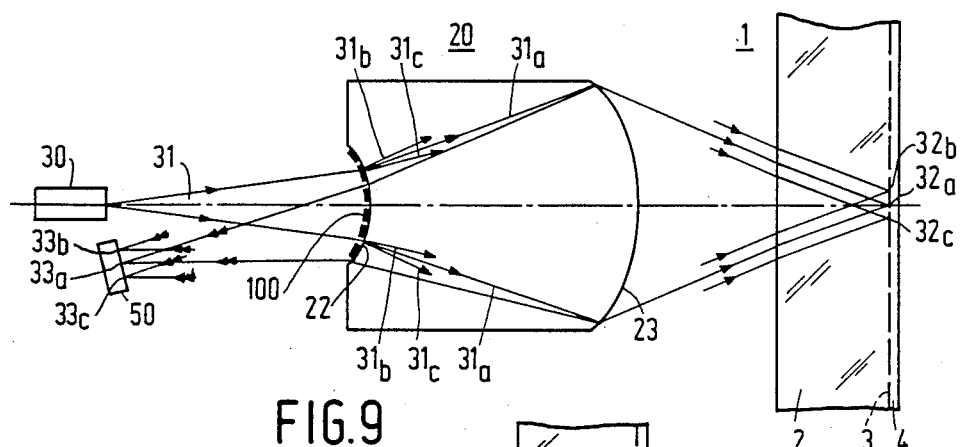
FIG. 9 shows an embodiment of the scanning device with a diffraction grating for forming two auxiliary beams.

As described in U.S. Pat. No. 3,376,842 a grating can be used for generating this tracking error signal. FIG. 9 shows an embodiment of a scanning device with such a grating 100. As is shown in this Figure, this grating splits a beam 31 emitted by the source 30 into a non-deflected zero order beam $31_a$, a beam $31_b$ diffracted in the +1 order and a beam $31_c$ diffracted in the −1 order and into a plurality of higher order beams. The last-mentioned beams are not important for the present invention because they are largely deflected outside the objective lens 20 and moreover have a small intensity. The grating 100 is a single, i.e. undivided grating. The parameters of this grating, notably the ratio between the width of the grating strips and that of the intermediate grating strips and the depth and the shape of the grating grooves can be chosen such that substantially all radiation of the incident beam 31 reaches the beams $31_a$, $31_b$ and $31_c$. Moreover, it can be ensured that the intensity of the beam $31_a$ is several times larger, for example, 6 times than that of each of the beams $31_b$ and $31_c$.

The beam $31_a$ is the main beam or scanning beam and forms the scanning spot $32_a$ in the information plane 3. The beams $31_b$ and $31_c$ are auxiliary beams which are focused by the objective lens 20 in two auxiliary spots $32_b$ and $32_c$ in the information plane. Since the auxiliary beams $31_b$ and $31_c$ are deflected at opposite angles by the grating 100, the auxiliary spots $32_b$ and $32_c$, viewed in the track direction, are located on both sides of the scanning spot $32_a$.

The angle between the direction of the grating strips of the grating 100 and the effective track direction is chosen to be such that the radiation spots $32_c$, $32_a$ and $32_b$, viewed in the track direction, are located one behind the other and, if the centre of the scanning spot $32_a$ is located on the centre line of the scanned track, the centre of the scanning spot $32_b$ is located on one edge of this track and the centre of the auxiliary spot $32_c$ is located on the other edge of this track. A separate detector is present in the radiation-sensitive detection system 50 for each auxiliary beam. In the situation in which the auxiliary spots $32_b$ and $32_c$ cover the track to an equal extent, the output signals of the said detectors are equal. When a tracking error occurs, the centre of one of the auxiliary spots moves towards the centre line of the track, while the centre of the other auxiliary spot moves away from the centre line and the output signals of the said separate detectors become unequal. The difference of the output signals of the detectors thus represents the tracking error signal.

To limit the number of sub-beams on the detection system 50, the grating 100 is preferably arranged between the radiation source 30 and the objective lens 20 and as close as possible to the radiation source so that the reflected beams no longer traverse this grating. The grating 100 may then have straight grating strips and a constant grating period. A grating 41' as shown in FIG. 3 can then be provided on the lens surface 23. If the grating 100 is provided on the lens surface 22 (FIG. 9), it is a holographic grating. Under circumstances it is alternatively possible to provide a grating 100 on the surface 23 and a grating 41' on the surface 22 of the objective lens 20.

Figure 10:
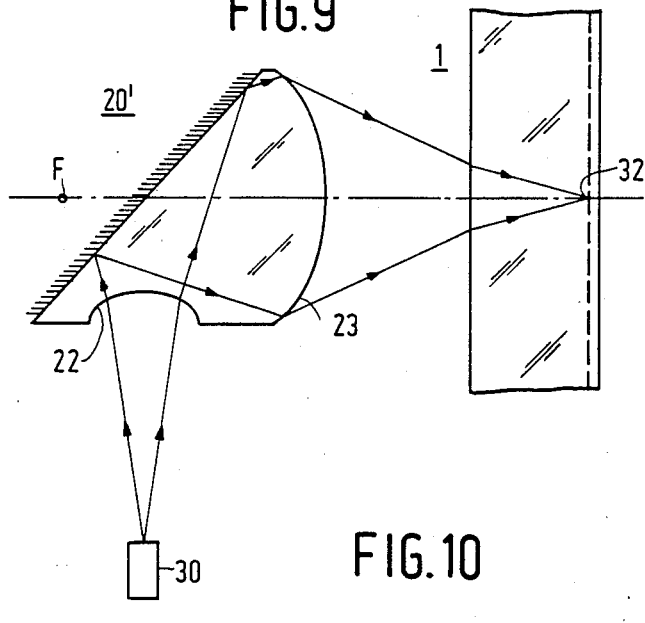
FIG. 10 shows an embodiment of the scanning device with a second modification of the objective lens according to the invention.

FIG. 10 shows a second principal embodiment of the objective lens 20' which is even smaller and lighter than that shown in FIGS. 1, 2, 3, 8 and 9. In addition to the two refractive surfaces 22 and 23, the objective lens of FIG. 10 has a third surface 110 which is reflecting and extends at an angle of approximately 45° to the original optical axis 00'. The scanning beam 31 and possibly the reflected beam 31' is thereby folded within the lens 20'. The lens 20' then has the same action as that of FIGS. 1, 2, 3, 8 and 9 but it comprises considerably less lens material.

One of the surfaces (23) or both surfaces 22 and 23 of the objective lens 20' are aspherical. These surfaces may be provided with a diffraction grating as described with reference to FIGS. 2, 3, 8 and 9. One of the gratings 41 and 41' according to FIGS. 2 and 3, respectively, may also be arranged on the reflecting surface 110 of the objective lens 20'.

The objective lens according to the invention may not only be used in a read apparatus but also in a write apparatus or in a combined write-read apparatus.

I claim:

1. An objective lens for focusing a diverging radiation beam into a diffraction-limited radiation spot, comprising a single lens body of transparent material having a first refractive surface on the object side and a second refractive surface on the image side, characterized in that both the first and the second refractive surfaces, viewed from the object side, are concave, in that the focal length is considerably smaller than its thickness along the axis and in that the second refractive surface is aspherical.

2. An objective lens as claimed in claim 1, characterized in that the first refractive surface is also aspherical.

3. An objective lens as claimed in claim 1 or 2, characterized in that a third surface is present between the first refractive surface and the second refractive surface, which third surface is reflecting and deflects the chief ray of the beam entering through the first refractive surface through an angle of approximately 90° towards the second refractive surface.

4. A scanning device for scanning an information plane on a transparent substrate of a record carrier, which scanning device comprises a radiation source facing the side of the substrate remote from the information plane and an objective system for focusing the diverging radiation beam supplied by the source to a scanning spot on the information layer, wherein the objective system is constituted by an objective lens comprising a single lens body of transparent material having a first refractive surface on the radiation source side and a second refractive surface on the information plane side, wherein both the first and the second refractive surfaces, viewed from the radiation source side, are concave, in that the focal length is considerably smaller than its thickness along the axis and in that the second refractive surface is aspherical.

5. A scanning device as claimed in claim 4, intended for scanning a reflecting information plane, characterized by a diffraction element for deflecting radiation from the information plane towards a radiation-sensitive detection system which is arranged at the same side of the objective lens as the radiation source.

6. A scanning device as claimed in claim 4, characterized by a diffraction element for forming a scanning beam and two auxiliary beams from the radiation beam supplied by the radiation source.

7. A scanning device as claimed in claim 5, characterized in that the diffraction element is an element introducing astigmatism and in that the radiation-sensitive detection system comprises four detectors which are arranged in four different quadrants around the chief ray of a beam deflected by the diffraction element.

8. A scanning device as claimed in claim 7, characterized in that the astigmatic diffraction grating is a holographic grating with curved grating strips and a nonlinearly varying grating period.

9. A scanning device as claimed in claim 5, characterized in that the first diffraction element is a composite diffraction grating comprising two sub-gratings, which grating splits the deflected scanning beam into two sub-beams, and in that the composite detection system comprises two detector pairs, the first and the second sub-beam cooperating with a first and a second detector pair, respectively.

10. A scanning device as claimed in claim 9, characterized in that the sub-gratings have a varying grating period and in that the grating strips of the sub-gratings are curved.

11. A scanning device as claimed in claim 9 or 10, characterized in that the grating strips of the one sub-grating have the same main direction as those of the other sub-grating, in that the average grating periods of the sub-gratings are different and in that the detector pairs are juxtaposed in a direction parallel to the bounding line between the sub-gratings.

12. A scanning device as claimed in claim 9 or 10, characterized in that the sub-gratings have the same average grating period, in that the main directions of the grating strips of the one sub-grating extend at a first angle and those of the other sub-grating extend at a second angle to the bounding line between the two sub-gratings and in that the detector pairs are juxtaposed in a direction transversely of the direction of the said bounding line.

13. A scanning device as claimed in claim 5, characterized in that the diffraction element is arranged on one of the surfaces of the objective lens.

* * * * *